United States Patent
Martinez Rueda et al.

(10) Patent No.: US 7,938,366 B2
(45) Date of Patent: May 10, 2011

(54) OPENING AND SECURE-CLOSING SYSTEM FOR DOORS

(75) Inventors: José Román Martinez Rueda, Madrid (ES); José Alberto Rojo Carrión, Madrid (ES); José Luis Sen Pacios, Madrid (ES); Juan Pablo Melián Brinquis, Madrid (ES); Nicolás Rojo Saiz, Madrid (ES); David Martin Calvo, Madrid (ES); Steffan Prys Thomas, Madrid (ES); Antonio Márquez Gavilán, Madrid (ES); María Aranzazu García Patino, Madrid (ES)

(73) Assignee: Airbus Operations, S.L., Madrid (ES)

( * ) Notice: Subject to any disclaimer, the term of this patent is extended or adjusted under 35 U.S.C. 154(b) by 1092 days.

(21) Appl. No.: 11/499,915

(22) Filed: Aug. 4, 2006

(65) Prior Publication Data

US 2007/0145189 A1    Jun. 28, 2007

(30) Foreign Application Priority Data

Oct. 31, 2005   (ES) .................................... 200502651

(51) Int. Cl.
    *B64C 1/14*   (2006.01)
(52) U.S. Cl. .................. 244/129.5; 244/129.4
(58) Field of Classification Search .............. 244/129.5, 244/129.4, 118.5; 49/13, 15, 16
    See application file for complete search history.

(56) References Cited

U.S. PATENT DOCUMENTS

| | | | |
|---|---|---|---|
| 1,703,795 A | 2/1929 | Stewart et al. | |
| 3,832,804 A * | 9/1974 | Goldsmith | 49/13 |
| 4,825,644 A | 5/1989 | Bubello et al. | |
| 5,337,977 A * | 8/1994 | Fleming et al. | 244/129.5 |
| 6,039,287 A | 3/2000 | Liston et al. | |
| 6,334,730 B1 | 1/2002 | Porte | |
| 6,659,401 B1 | 12/2003 | Semprini | |
| 6,830,217 B2 * | 12/2004 | Movsesian et al. | 244/129.5 |
| 7,172,154 B2 * | 2/2007 | Tomiyama et al. | 244/118.5 |
| 7,578,475 B2 * | 8/2009 | Pratt et al. | 244/129.4 |
| 2003/0080249 A1 | 5/2003 | Raczkowski | |
| 2005/0006528 A1 * | 1/2005 | Movsesian et al. | 244/129.5 |
| 2005/0082433 A1 * | 4/2005 | Saku et al. | 244/129.5 |
| 2008/0173760 A1 * | 7/2008 | Ponsart et al. | 244/129.5 |
| 2009/0118876 A1 * | 5/2009 | Yadollahi | 701/14 |

FOREIGN PATENT DOCUMENTS

| | | |
|---|---|---|
| EP | 1 069 044 | 1/2001 |
| EP | 1440884 | 7/2004 |
| FR | 2 771 459 | 5/1999 |
| GB | 2403774 | 1/2005 |

* cited by examiner

*Primary Examiner* — Christopher P Ellis
(74) *Attorney, Agent, or Firm* — Klauber & Jackson LLC (57) ABSTRACT

Opening and secure-closing system for doors comprising two doors (1,2) for accessing the interior of a chamber, which open towards the outside being hinged around two hinging axes (19,20), both doors (1,2) comprising a set of bolts (17, 18) and the opening and closing system comprising additional means of opening/closing operation (26) and an overpressure door (3) located in one of the doors (1,2) which opens towards the outside, in such a way that the means of opening/closing operation (26) comprise a blocking bar (4), a blocking fitting (7) and means of retention (10) between the two doors (1,2) in order to provide a controlled and sequential opening/closing operation of the chamber, and the overpressure door (3) is opened automatically in the event of emergency due to overpressure, and it also participates in the controlled and sequential opening/closing operation of the chamber.

16 Claims, 12 Drawing Sheets

OPENING AND SECURE-CLOSING SYSTEM FOR DOORS

CROSS REFERENCE TO RELATED APPLICATIONS

The present application claims priority from Spanish Application Serial No. P200502651, filed on Oct. 31, 2005. Applicants claim priority under 35 U.S.C. §119 as to the said Spanish application, and the entire disclosure of said application is incorporated herein by reference in its entirety.

TECHNICAL FIELD OF THE INVENTION

This invention belongs to the technical field of safety opening and closing devices and systems for doors, and more particularly to safety opening and closing systems for doors which give access to chambers that could suffer overpressure in the field of aeronautics, more specifically the opening and closing of doors for the chamber in which the auxiliary engine is housed in an aircraft.

STATE OF THE ART PRIOR TO THE INVENTION

In the field of aeronautics, the doors of the chambers in which the auxiliary engine is housed have to meet two main requirements.

The first of these is that the doors have to open automatically in the event that there exists overpressure in the chamber during the flight, in order to prevent situations of non-permitted loads on the structure.

The second requirement is one of safety of operation in the opening and/or closing of the doors when maintenance is carried out on the chamber and on the auxiliary engine. If the engine is running on the ground during the maintenance process, it can produce a suction on the doors of the chamber, which, when they close, could trap the ground personnel inside and, if they need to be opened, it could prevent this from happening. In order to avoid this, a controlled and sequential opening/closing control system is required implying a set of defined and sequential operations for being able to open the doors safely.

In the state of the art there exist some controlled and sequential opening/closing control systems but these systems can find their proper functioning affected by the additional overpressure door, which, moreover, has the disadvantage that, due to being located in a different place from the doors for the chamber, it needs more space and can give rise to problems in the design of the structure, and precisely because it is separate from the doors with the opening/closing control system it can interfere in the correct functioning of these control systems.

DESCRIPTION OF THE INVENTION

The present invention has the aim of overcoming the drawbacks of the mechanisms of the state of the art by means of a opening and secure-closing system for doors. Said invention applies to the opening and closing of the doors of compartments in the aeronautical sector, which need safety requirements, and more specifically for the opening and closing of the doors for the chamber which houses the auxiliary engine in an aircraft.

Said safety opening and closing system comprises a first and a second door for accessing the interior of a chamber; said doors open towards the outside being hinged around separate hinging axes, and both doors present a set of bolts.

The system of the present invention includes additional means of opening/closing operation which provide safety in the opening and closing thanks to the set of sequential operations that have to be performed on those means of opening/closing for being able to open/close the doors.

In addition, the system presents an overpressure door, which will open in order to prevent overpressure inside the chamber which would give rise to non-permitted loads on the structure.

Said system of the present invention is characterised in that the overpressure door is provided in the first door or in the second door, it is of a smaller size than those doors, and it opens towards the outside. Also, the means of opening/closing operation comprise means of retention between the first door and the second door, in such a way that the second door can only be opened once the first door is open, and the set of first and second doors (1,2) can only be closed by first of all closing the second door (2) and then the first door (1).

The advantage shown by this configuration of the invention is that it does not need an overpressure door independent of the access doors to the chamber where the auxiliary engine is housed, since said overpressure door is included in one of the doors. Moreover, included in a single assembly are both the safety requirements regarding possible overpressures thanks to the overpressure door and the requirements of controlled and sequential opening of the access doors to the chamber where the auxiliary engine is housed, for possible maintenance operations in a way that is safe, thanks to the additional means of opening/closing operation.

In one of the embodiments of the invention, the means of opening/closing operation are inside the chamber accessed through the door, in such a way that the overpressure door is accessed from the outside of those means of opening/closing operation in order to be able to open and/or close the doors in a way that is controlled and sequential.

In one embodiment, the overpressure door is provided in the first door, secured to it by means of rotary fittings contained in the overpressure door, and said overpressure door comprises some latches with access from the outside for their manual opening. In addition, said latches are rated for a certain pressure so that they open automatically in the event of emergency due to an overpressure.

In an embodiment of the means of opening/closing operation, these are located inside the chamber, and in the same door as that where the overpressure door is situated, in other words, the first door, thereby facilitating access to those means once the overpressure door is opened. Said means of opening/closing operation comprise a cylindrical blocking bar parallel to the hinging axis for the door, a blocking pin, and a blocking fitting into which the blocking bar is introduced. Said blocking bar comprises a guide channel through which the blocking pin of the blocking bar is introduced, and a spring which actuates the bar in its movement for opening and/or closing of the door.

In this way, when the door where the overpressure door is situated is closed, the blocking bar is introduced into some means of securing of the fixed structure, ensuring the closing of the door, and for the opening, once the overpressure door is open, via it to the blocking bar, and it is pushed actuating the spring, in such a way that the blocking pin is guided by the guide channel, permitting the displacement of the bar, and said blocking pin is secured at one end of said guide channel maintaining the bar in a position free of the securing means of the fixed structure thus permitting that door to be opened.

This embodiment presents the advantage of simple actuation of the means of opening/closing operation of the door where these means are located.

In an embodiment of the spring that permits movement of the blocking bar, this spring is located in the same axis as the blocking bar as a continuation of said blocking bar, in such a way that when this bar moves, the spring is working under compression.

In an alternative embodiment of the spring, this is secured to said blocking bar and to the blocking fitting, forming a certain angle with said bar, in such a way that when the blocking bar moves, the spring is working under traction.

The means of retention of the means of opening/closing operation, which are located between the first door and the second door, are angle bars secured to one of the doors and free at the other.

In addition, the blocking bar comprises a stop element for the blocking bar complementary to at least one stop element of the overpressure door, in such a way that once the overpressure door is open and the blocking bar has been displaced permitting the first door to be opened, the stop element of the blocking bar and the stop element of the overpressure door make contact with each other, preventing the involuntary or accidental closure of said pressure door.

In a preferred embodiment of the invention, the first door and the second door comprise means of securing that are secured to the fixed structure when said doors are opened, thereby preventing their involuntary or accidental closure, and said means of securing consist of telescopic bars.

BRIEF DESCRIPTION OF THE FIGURES

Below, in order to facilitate a better understanding of this specification and forming an integral part thereof, some drawings are attached in which, by way of illustration only and not limiting, the object of the invention has been represented in some of its different embodiments.

Appearing in these figures are numerical references denoting the following elements:
1. First door
2. Second door
3. Overpressure door
4. Blocking bar
5. Latches
6. Rotary fittings for the overpressure door
7. Blocking fitting
8. Spring for the blocking fitting
9. Blocking pin
10. Means of retention, angle bars
11. Passage hole for the first door
12. Means of securing of the fixed structure
13. Stop element for the blocking bar
14. Stop element for the overpressure door
15. Means of securing of the first door, telescopic bar for the first door
16. Means of securing of the second door, telescopic bar for the second door
17. Bolts for the first door
18. Bolts for the second door
19. First hinging axis
20. Second hinging axis
21. Guide channel
22. Cylindrical body of the stop for the blocking bar
23. Elongated body of the stop for the blocking bar
24. Securing point
25. Means of retention of the guide channel
26. Means of opening/closing operation
27. Inside surface of the first door
28. First advance section of the guide channel
29. Second ascending section of the guide channel
30. Final section of the guide channel

MODES OF EMBODIMENT OF THE INVENTION

Figure 1:
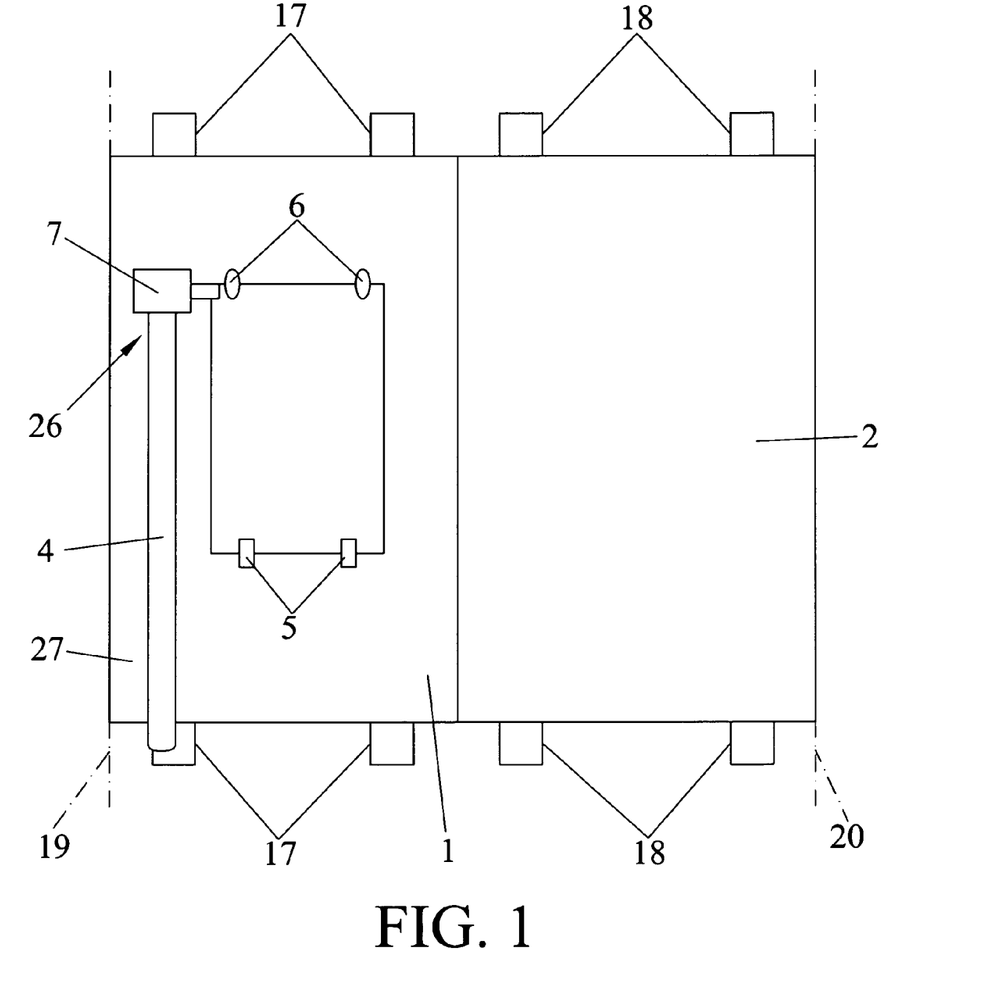
FIG. 1 is a diagrammatic view from the inside of the inventive system.
Figure 2:
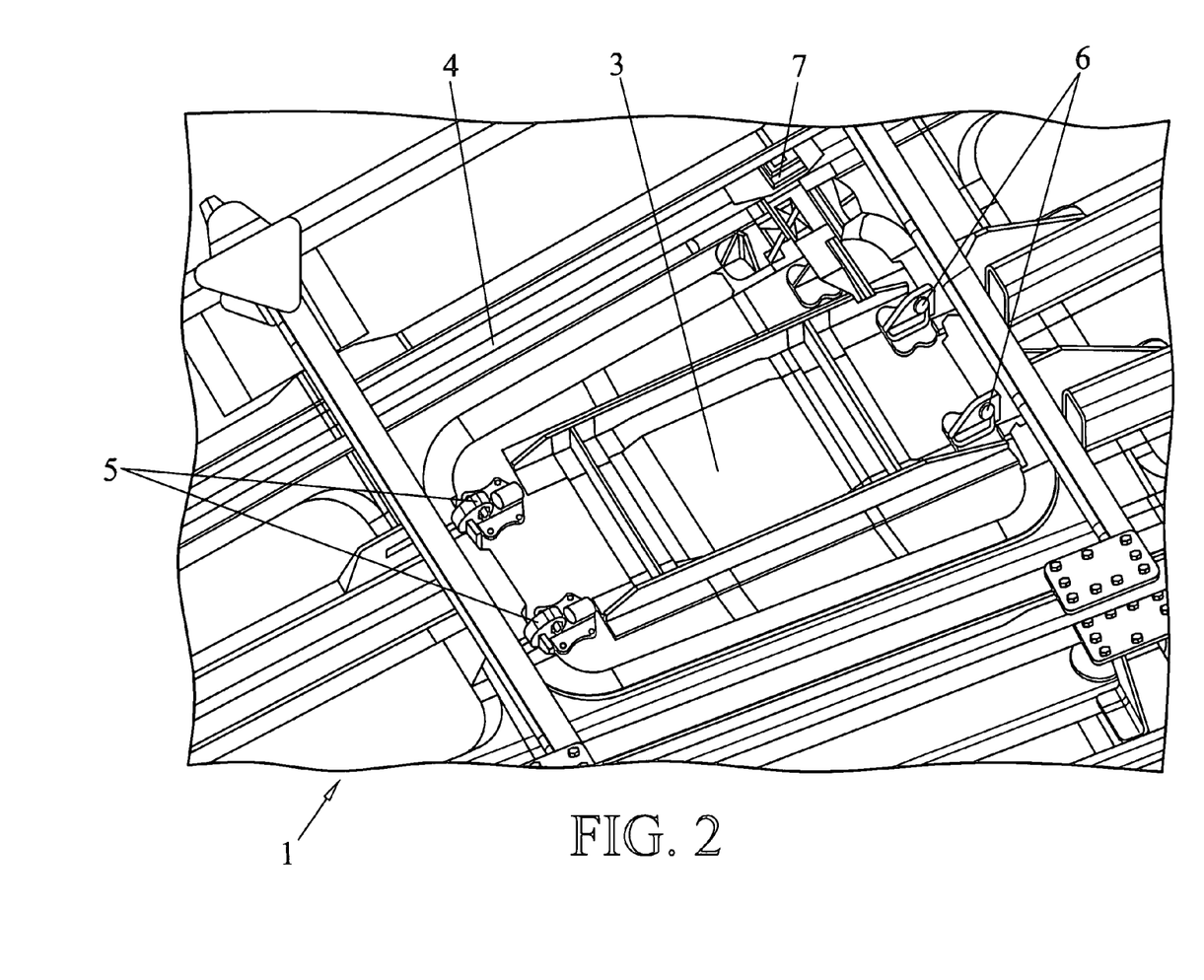
FIG. 2 is a detailed view from the inside of the first door of the inventive system.

FIGS. 1 and 2 show an embodiment of the invention which comprises a first door 1 and a second door 2 used for accessing the interior of a chamber. In particular and preferably, this chamber is the compartment where the auxiliary engine of an aircraft is housed. These doors open towards the outside, the first door hinging around a first hinging axis 19 and the second door 2 around a second hinging axis 20. The first door 1 comprises a set of first bolts 17 and the second door comprises a set of second bolts 18, via which the doors are closed being secured to the surface where these are located.

As can be seen in FIGS. 1 and 2, the opening and secure-closing system for doors furthermore comprises additional means of opening/closing operation 26 in order to provide security, and an overpressure door 3.

Said opening and secure-closing system for doors is characterised in that the overpressure door 3 is situated in one of the doors 1,2, being of a smaller size than said doors 1,2 and in that it opens towards the outside.

The advantage shown by the present invention is that no additional space is necessary for the location of the overpressure door, since it is provided in one of the doors 1,2. Moreover, another advantage is that a single system provides the functions of security in the event of possible overpressures, thanks to the overpressure door 3, and also the function of security thanks to the additional means of opening/closing operation 26.

In an embodiment of the invention, the means of opening/closing operation 26 comprise means of retention 10 between the first door 1 and the second door 2, which permit a sequential and controlled opening and closing of said doors 1,2, in such a way that the second door 2 can only be opened once the first door 1 is opened, and the first door 1 can only be closed once the second door 2 is closed.

Said means of retention can either be secured to the first door 1 and be free at the second door 2, or it can be secured to the second door 2 and be free at the first door 1.

Figure 8:
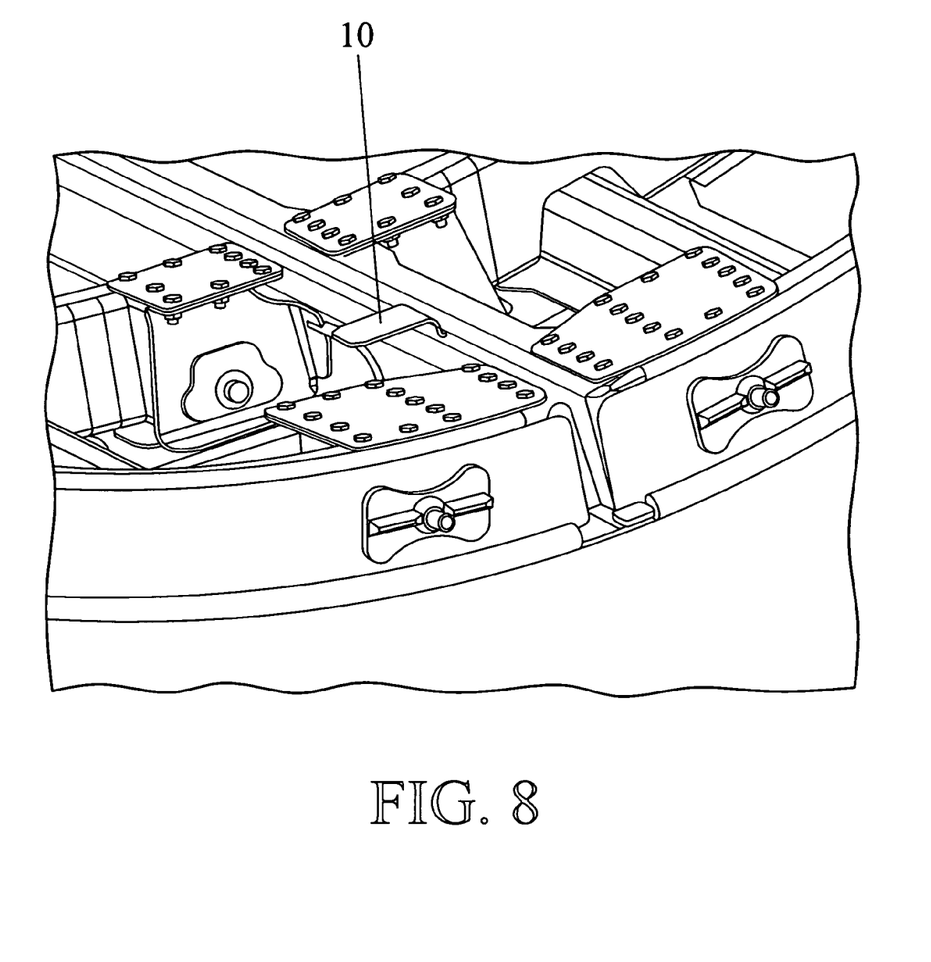
FIG. 8 is a detailed view of the arrangement of the angle bars in a preferred embodiment of the invention.

FIG. 8 shows a preferred embodiment of the means of retention 10, in which said means of retention are angle bars 10. The advantage of this embodiment is that with some simple configuration and assembly elements the effect is achieved in which if the first door 1 is closed, it will block the opening of the second door 2, which will not be able to open until said first door is open. And for the closure, if the first door 1 is closed first, the angle bars will block the second door 2, and so the assembly will not be able to close. Therefore, first the door 2 has to be closed and then the door 1.

In one of the embodiments of the invention, the means of opening/closing operation 26 are provided in the interior of the chamber to which the first door 1 and the second door 2 give access, and it will only be by opening the overpressure door 3 that access will be able to be had to said means of opening/closing operation 26. Therefore, said overpressure door 3 is the first element that participates in the sequential and controlled opening of the chamber.

Figure 11:
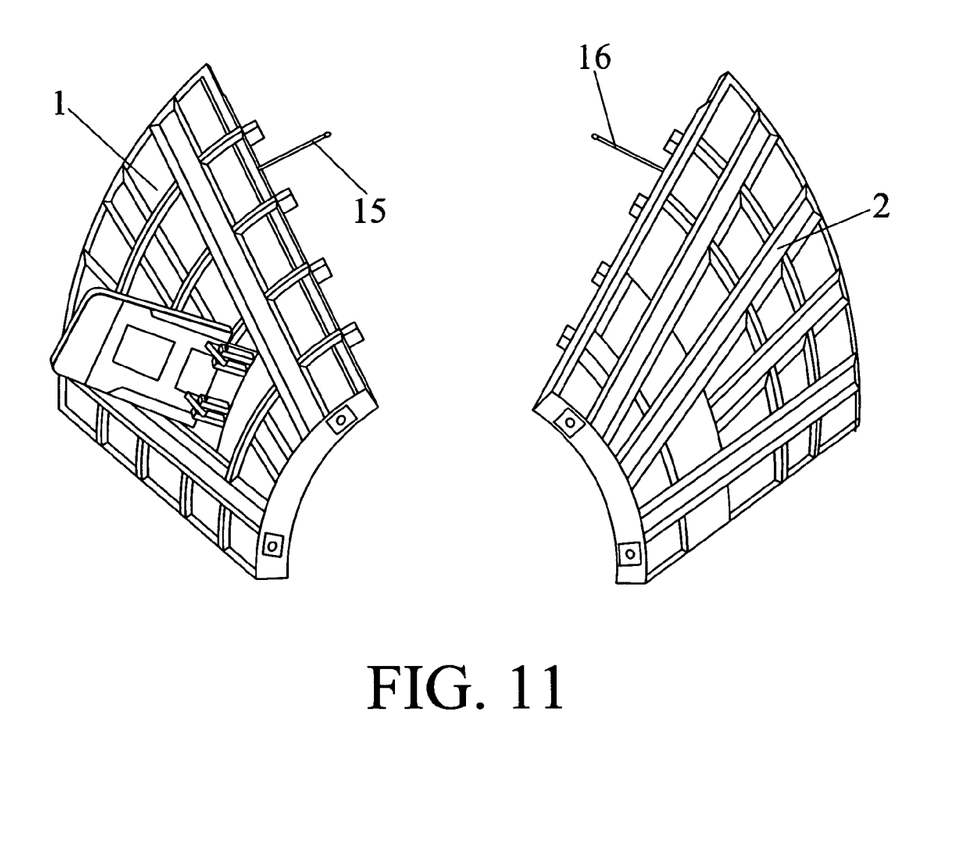
FIG. 11 is a detailed view of the telescopic securing tubes according to a preferred embodiment of the invention.

As can be seen in FIGS. 1, 2 and 11, the overpressure door 3 is situated in the first door 1 (though in an alternative embodiment it could be in the second door 2) secured to said first door 1 by means of rotary fittings contained in the overpressure door 6, thanks to which the opening/closing movement is carried out. The overpressure door 3 additionally comprises some latches 5 with access from the outside for their manual opening from outside for maintenance operations in the chamber to which the first and second door 1,2 provide access. Moreover, these latches 5 are rated at a determined pressure for the automatic opening of the overpressure door 3 due to an overpressure. Thanks to this dual function, the overpressure door participates in the sequential and controlled opening operation of the chamber, as has been mentioned earlier, and in addition it functions as a safety element which opens in the event that there exist an overpressure inside the chamber.

In an embodiment of the means of opening/closing operation 26, as can be seen in FIGS. 1 and 2, these are arranged on the inside surface 27 of said first door 1 (though in an alternative embodiment they could be in the second door 2, always provided they are in the door where the overpressure door 3 is situated). In this way, the opening/closing operation will be simpler thanks to a more comfortable access to the means of opening/closing operation 26 via the overpressure door when said overpressure door is open.

Figure 3:
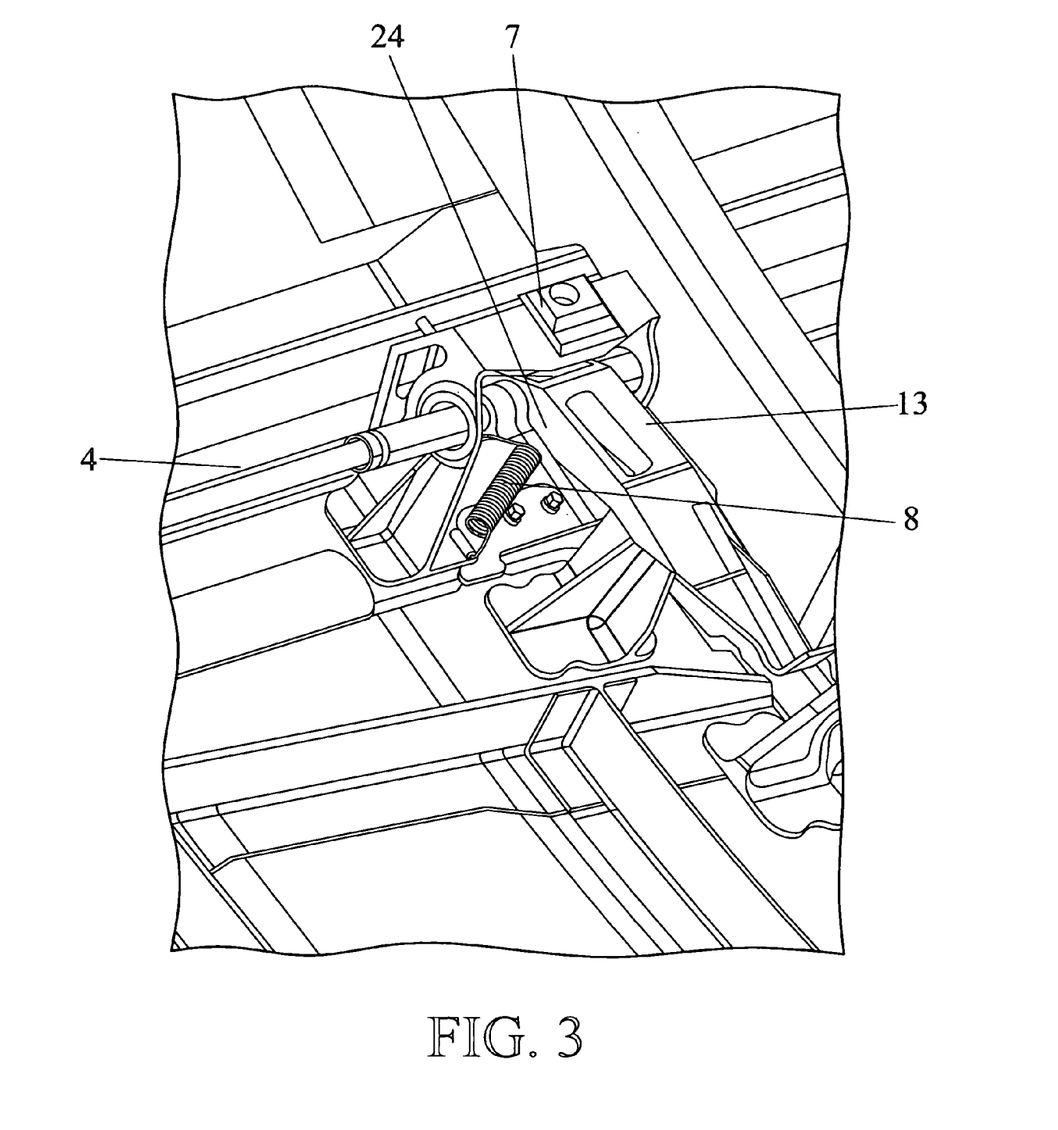
FIG. 3 is a detailed view of a preferred embodiment of the invention where the blocking fitting and the spring can be seen.
Figure 5:
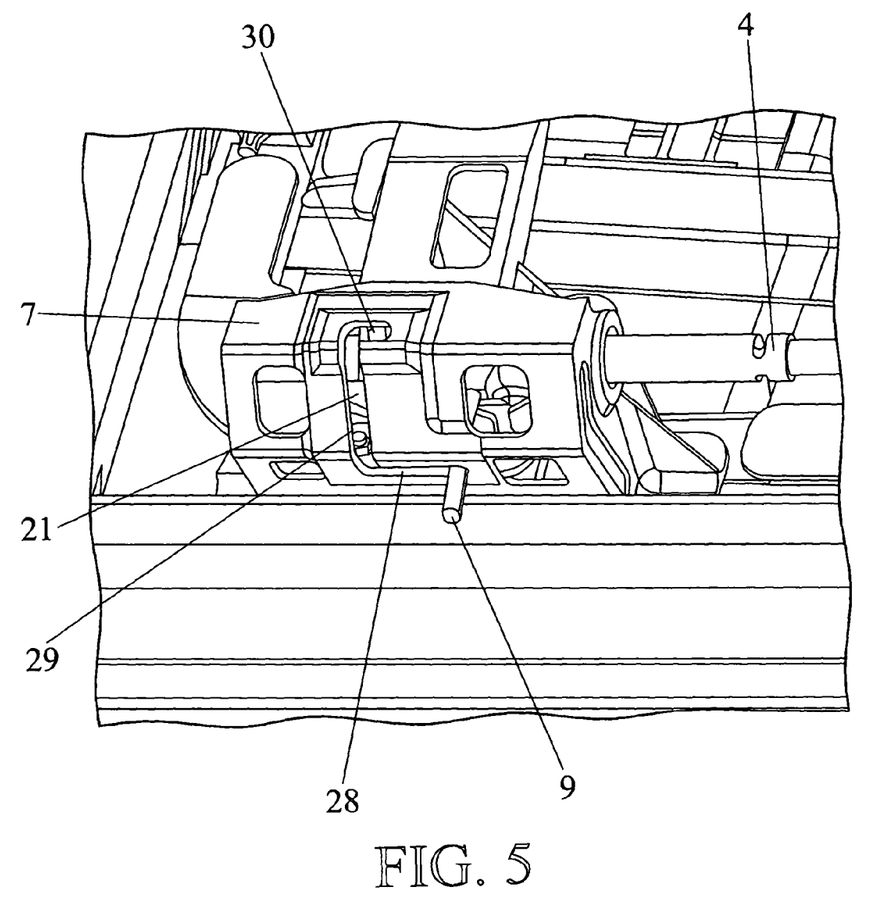
FIG. 5 is a detailed view of a preferred embodiment of the invention where the guide channel can be seen in the blocking fitting.
Figure 6:
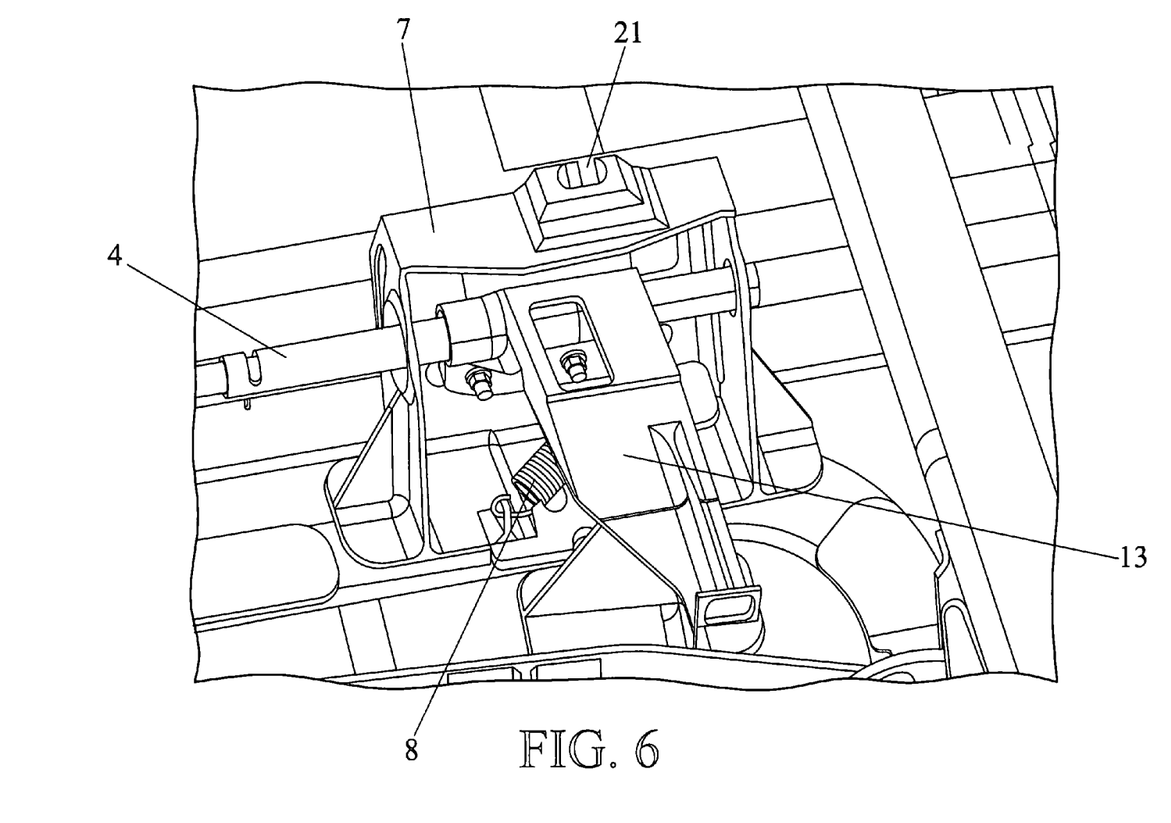
FIG. 6 is a detailed view of a preferred embodiment of the arrangement of the spring.

As can be seen in FIGS. 3, 5 and 6, the means of opening/closing operation 26 additionally comprise a cylindrical blocking bar 4 provided in the direction parallel to the first hinging axis 19 which presents a blocking pin 9 perpendicular to said blocking bar 4. Said means of opening/closing operation 26 also comprise a blocking fitting 7 complementary to the blocking bar 4, via which said blocking bar 4 is introduced. The blocking fitting 7 comprises a guide channel 21 parallel to the axis of the blocking bar 4 and complementary to the blocking pin 9, via which said blocking pin 9 is introduced. In addition, the blocking fitting 7 comprises a spring 8 which actuates the blocking bar 4 in its movement for the opening and closing of the first door 1.

Figure 4:
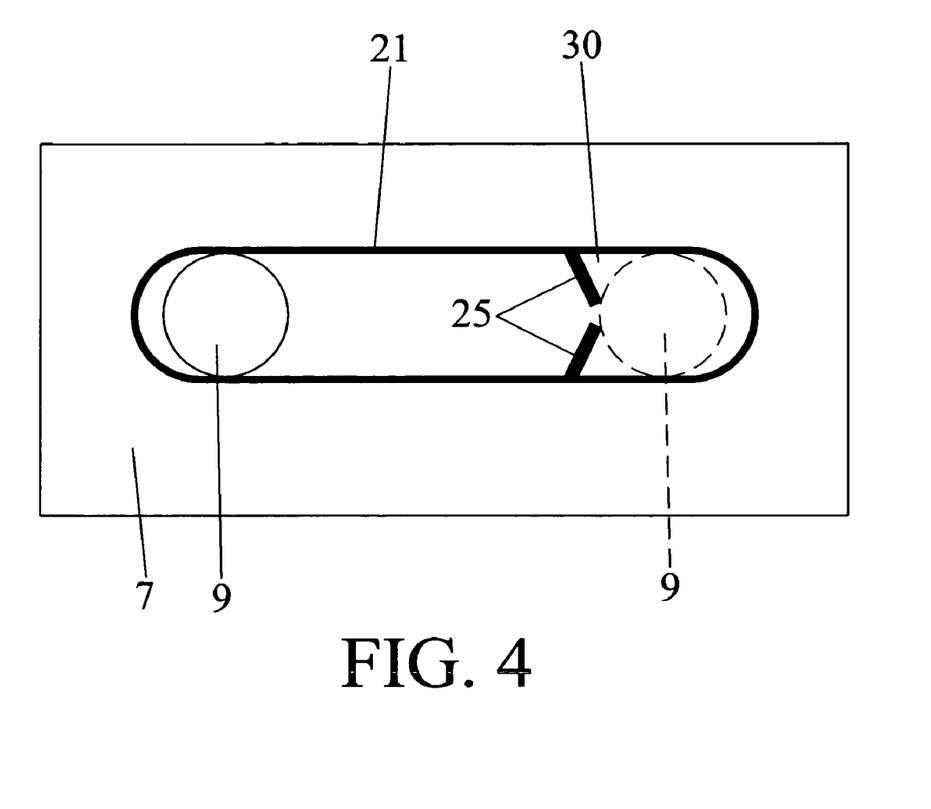
FIG. 4 is a diagrammatic view of the guide channel according to a first embodiment.
Figure 12:
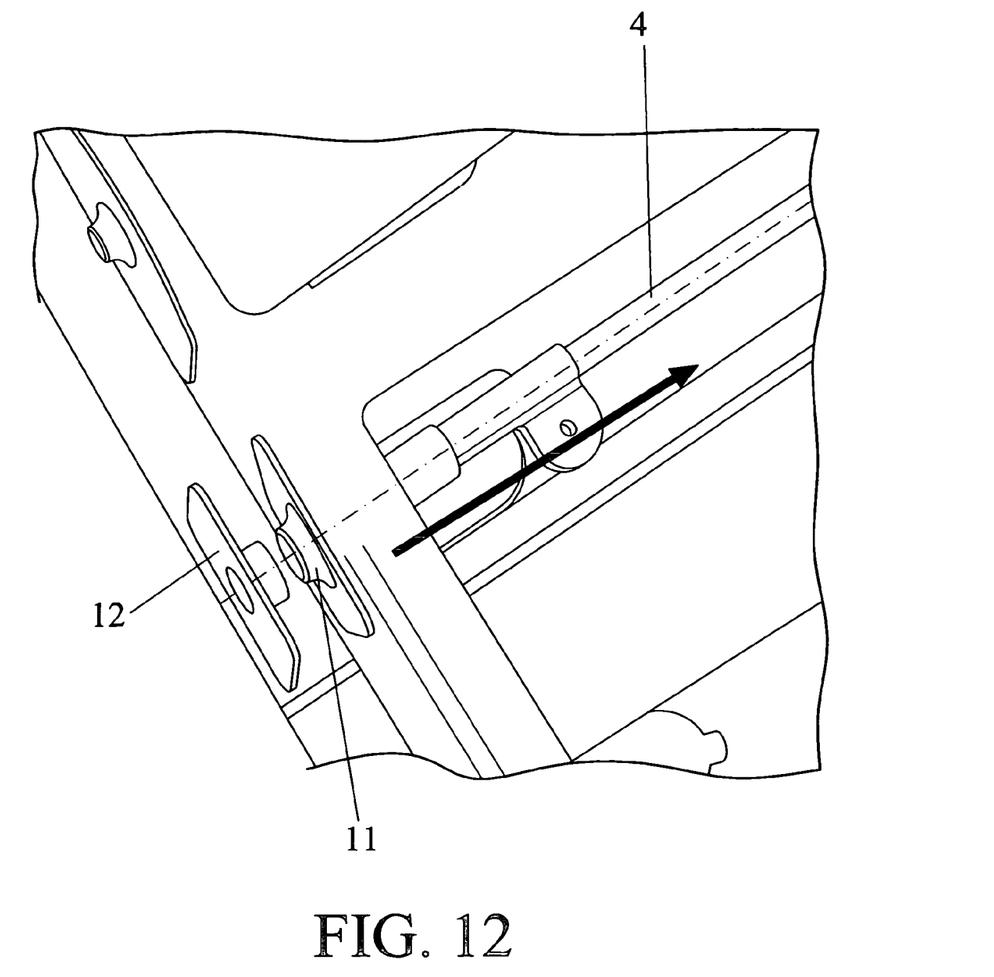
FIG. 12 is a detailed view of the blocking bar and passage hole of the first door.

The means of opening/closing operation 26 function in such a way that, with the first door 1 closed, the blocking bar 4 traverses a passage hole of the first door 11 and is introduced into some means of securing of the fixed structure 12, as can be seen in FIG. 12, ensuring the closure of the door, and for the operation of opening, once the overpressure door 3 is open, via this access is gained to the blocking bar 4 and it is pushed by actuating the spring 8 in such a way that the blocking pin 9 is guided by the guide channel 21 permitting the displacement of the blocking bar 4, and said blocking pin 9 is secured to one end of said guide channel 21 via some means of retention of the guide channel 25 maintaining the blocking bar 4 fixed in a position free of the means of securing of the fixed structure 12, thereby permitting the opening of said first door 1. FIG. 4 diagrammatically shows the embodiment of the guide channel 21, together with the blocking pin 9 in two different positions, and the means of retention of the guide channel 25 which block the blocking pin 9. Once the first door 1 is open, the means of retention 10 permit the opening of the second door 2, leaving access to the chamber completely open. The advantage of this configuration is the simplicity of the operation, since the operator only has to push the blocking bar 4, with the displacement of this being carried out thanks to the spring 8 and to the blocking pin 9, and the securing of the bar in a position outside of the means of securing of the fixed structure 12 is done efficiently and simply thanks to the securing at the end of the guide channel 21.

FIGS. 3 and 6 show an embodiment of the spring 8, in which it is secured to the blocking bar 4 by means of a securing point 24, and is also secured to the blocking fitting 7 in a position intermediate between the passage hole for the first door 11 and the securing point 24 of the spring 8 to the blocking bar 4, in such a way that when said blocking bar 4 moves, the spring 8 is working under traction.

Figure 7:
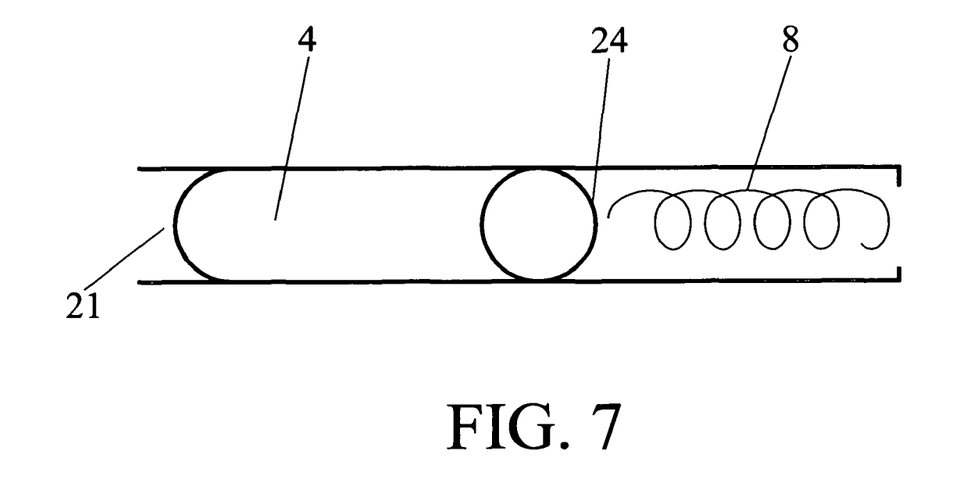
FIG. 7 is a diagrammatic view of a second embodiment of the arrangement of the spring.

FIG. 7 shows an alternative embodiment of the spring 8, in which said spring 8 is arranged along the longitudinal axis of the blocking bar 4 as a continuation of that blocking bar 4, in such a way that when said blocking bar 4 moves, the spring 8 is working under compression.

In another embodiment of the spring, the blocking bar 4 additionally comprises, in a position close to the rotary fittings of the overpressure door 6, at least one stop element of the blocking bar 13, which is complementary to at least one stop element of the overpressure door 14 provided in the overpressure door 3, in a position close to said rotary fittings of the overpressure door 6. These stop elements 13, 14 present the advantage that, once the overpressure door 3 is open and the blocking bar 4 has been displaced permitting the first door 1 to be opened, the stop element of the blocking bar 13 and the stop element of the overpressure door 14 make contact with each other, preventing the involuntary closure of the overpressure door 3.

In an embodiment of the stop element of the blocking bar 13, it comprises a cylindrical body 22 coaxial with the blocking bar 4 and which can rotate around the latter, and an elongated body 23 in the direction perpendicular to the axis of the cylindrical body 22 and fixed integrally with it. In this way, once the operator has displaced the blocking bar 4 in order to release it from the means of securing of the fixed structure 12, and said blocking bar has become fixed by means of the blocking pin 9 and the means of retention of the channel 25, it is only necessary to rotate the cylindrical body 22 around the blocking bar 4 until the elongated body 23 remains in a substantially vertical position and, in this way, the accidental or involuntary closure of the overpressure door 3 will be prevented due to the elongated body 23 making contact with the stop element of the overpressure door 14. The advantage of this configuration is the simplicity of the stop elements and the fact that no additional element is needed in the blocking fitting in order to achieve the adequate functioning of the stop element of the blocking bar.

Figure 9:
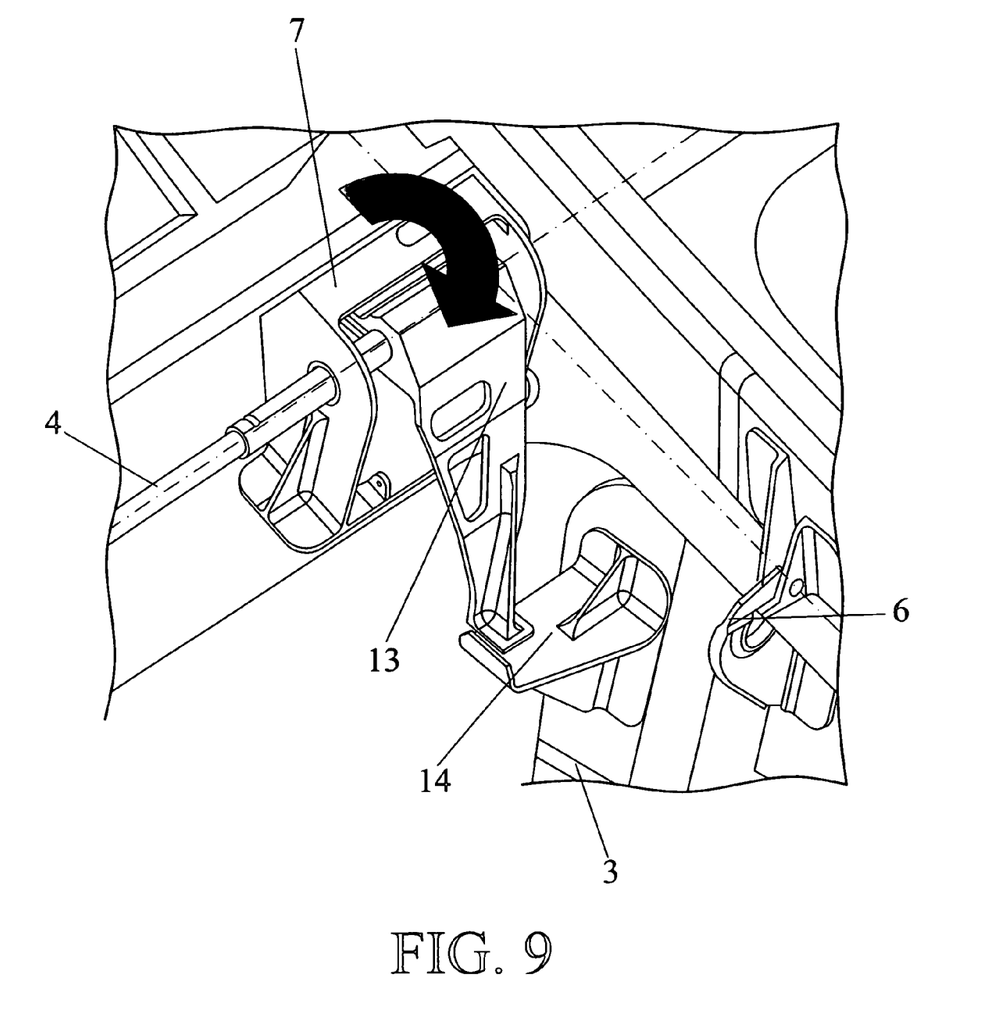
FIG. 9 is a detailed view of the stop elements according to a preferred embodiment of the invention.
Figure 10:
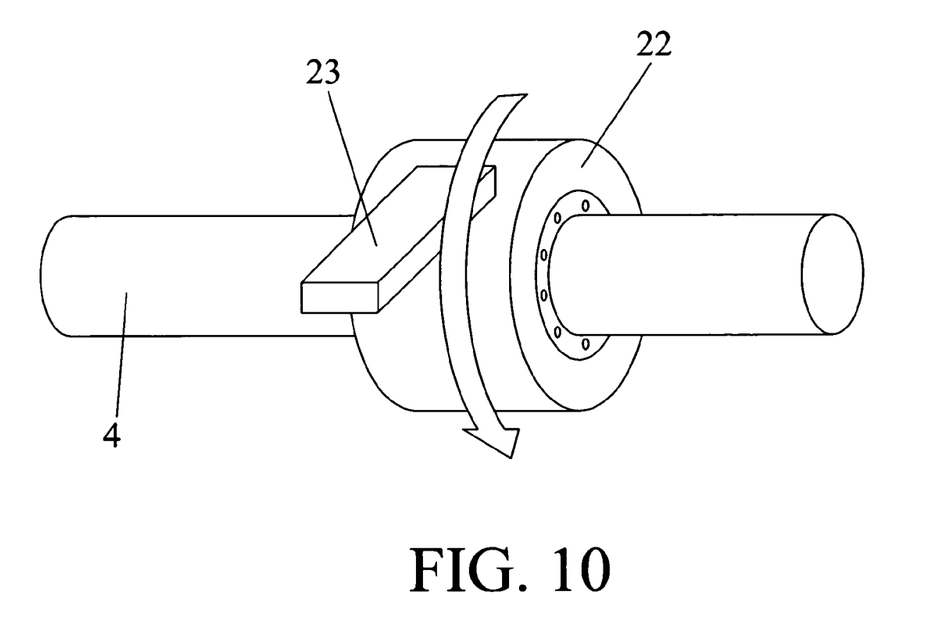
FIG. 10 is a diagrammatic view of the stop elements according to a second embodiment of the invention.

In a preferred embodiment of the invention, the stop element of the blocking bar 13 comprises an elongated body 23 in the direction perpendicular to the axis of the blocking bar 4 and is fixed to said blocking bar 4. In that embodiment, the guide channel 21 of the blocking fitting 7 has a first advance section of the guide channel 28 parallel to the axis of the blocking bar, a second ascending section 29 of the guide channel and a final section of the guide channel 30, parallel to the first advance section of the guide channel 28 and with a length much less than said first advance section of the guide channel 28, and reversing in the direction of the blocking bar 4, in such a way that the movement of the blocking pin 9 along the second ascending section of the guide channel 29 gives rise to the rotation of the blocking bar 4. Said blocking bar 4 drags the stop element of the blocking bar 13 as far as a position in which said stop element of the blocking bar 13 remains in a substantially vertical position and makes contact with the stop element of the overpressure door 14, the blocking pin 9 remaining inserted in the final section of the guide channel 30 owing to the action of the spring 8 and securing the blocking bar 4, thereby preventing the involuntary closure of the overpressure door 3. The advantage of this embodiment is that with a single pushing movement by the operator, the blocking bar 4 becomes unblocked, permitting the opening of the first door 1, and the stop element of the blocking bar 13 is located in a contact position with the stop element of the overpressure door 14, thereby preventing the involuntary closure of the overpressure door 3. FIG. 5 shows the form of the guide channel 9 necessary for this embodiment, as does FIG. 9.

In a preferred embodiment of the opening and secure-closing system for doors, both the first door 1 and the second door 2 comprise means of securing of the first and second door 15,16 which are secured to the fixed structure once said first and second door 1,2 are open, thereby preventing their involuntary or accidental closure.

Said means of securing are telescopic bars which are extended when the first door 1 and the second door 2 are open, resting against the outside surface of the aircraft and preventing the involuntary closure of said doors 1,2.

The invention claimed is:

1. Opening and secure-closing system for doors comprising a first door and a second door used for accessing the interior of a chamber, and which open towards the outside being hinged around a first hinging axis and a second hinging axis, said first door comprising a set of first bolts and said second door comprising a set of second bolts, said opening and secure-closing system for doors additionally comprising additional means of opening/closing operation and an overpressure door, said opening and secure-closing system for doors being wherein
   said overpressure door is located in one of the said doors being of a smaller size than said doors and in that it opens towards the outside.

2. Opening and secure-closing system for doors according to claim 1, wherein said means of opening/closing operation comprise means of retention between the first door and the second door, which permit sequential and controlled opening and closing of the first door and of the second door in such a way that the second door can only be opened once the first door is open, and the set of the first and second door can only be closed correctly by closing the second door first and then the first door.

3. Opening and secure-closing system for doors according to claim 1, wherein the means of opening/closing operation are arranged in the interior of the chamber to which the first door and the second door give access, and via the overpressure door access is had from the outside to the means of controlled and sequential opening/closing operation of the first door and the second door when said overpressure door is open.

4. Opening and secure-closing system for doors according to claim 1, wherein said overpressure door is located in the first door and secured to said first door, by means of rotary fittings of the overpressure door, and said overpressure door comprises some latches with access from the outside for its manual opening, and rated at a defined pressure for the automatic opening of the overpressure door 3 owing to overpressure.

5. Opening and secure-closing system for doors according to claim 1, wherein the first door 1 comprises an inside surface, and the controlled means of opening/closing operation are located in the inside surface of the first door and they additionally comprise
   a cylindrical blocking bar provided in the direction parallel to the first hinging axis, which presents a blocking pin perpendicular to said blocking bar,
   a blocking fitting complementary to the blocking bar via which said blocking bar is introduced, said blocking fitting comprising
   a guide channel parallel to the axis of the blocking bar and complementary to the blocking pin, via which said blocking pin is introduced and
   a spring which actuates the blocking bar in its movement for the opening and closing of the first door
in such a way that the first door being closed, said blocking bar traverses a passage hole of the first door and is introduced into some means of securing of the fixed structure, ensuring the closure of the first door, and for the operation of opening, once the overpressure door is open, via said overpressure door, access is gained to the blocking bar and it is pushed by actuating the spring in such a way that the blocking pin is guided by the guide channel permitting the displacement of the blocking bar, and said blocking pin is secured to a final end section of the guide channel of said guide channel via some means of retention of the guide channel maintaining the blocking bar fixed in a position free of the means of securing of the fixed structure, thereby permitting the opening of said first door.

6. Opening and secure-closing system for doors according to claim 5, wherein the spring is secured to the blocking bar by means of a securing point, and is also secured to the blocking fitting in a position intermediate between the passage hole for the first door and the securing point of the spring to the blocking bar, in such a way that when said blocking bar moves, the spring is working under traction.

7. Opening and secure-closing system for doors according to claim 5, wherein the spring is arranged along the longitudinal axis of the blocking bar as a continuation of that blocking bar, in such a way that when said blocking bar moves, the spring is working under compression.

8. Opening and secure-closing system for doors according to claim 2, wherein said means of retention are angle bars.

9. Opening and secure-closing system for doors according to claim 2, wherein said means of retention are secured to the first door.

10. Opening and secure-closing system for doors according to claim 2, wherein said means of retention are secured to the second door.

11. Opening and secure-closing system for doors according to claim 5, wherein the blocking bar additionally comprises, in a position close to the rotary fittings of the overpressure door, at least one stop element of the blocking bar complementary to at least one stop element of the overpressure door provided in the overpressure door, in a position close to said rotary fittings of the overpressure door, in such a way that once the overpressure door is open and the blocking bar has been displaced permitting the first door to be opened, the stop element of the blocking bar and said stop element of the overpressure door make contact with each other, preventing the involuntary closure of said overpressure door.

12. Opening and secure-closing system for doors according to claim 11, wherein said stop element of the blocking bar comprises
   a cylindrical body coaxial with the blocking bar and which can rotate around said blocking bar and
   an elongated body in the direction perpendicular to the axis of the cylindrical body and fixed integrally with it,
in such a way that contact between said stop element of the blocking bar and said stop element of the overpressure door is achieved by rotating the stop element of the blocking bar around the blocking bar.

13. Opening and secure-closing system for doors according to claim 11, wherein said stop element of the blocking bar comprises an elongated body in the direction perpendicular to the axis of the blocking bar and is fixed to said blocking bar and the guide channel of the blocking fitting comprises a first advance section of the guide channel parallel to the axis of said blocking bar, a second ascending section of the guide channel perpendicular to the first section and ascending, and a final section of the guide channel, parallel to the first advance section of the guide channel and with a length much less than said first advance section of the guide channel, and reversing in the direction of the blocking bar, in such a way that the movement of the blocking pin along the second ascending section of the guide channel gives rise to the rotation of the blocking bar dragging with it the stop element of the blocking bar as far as a position in which said stop element of the blocking bar makes contact with the stop element of the overpressure door, the blocking pin remaining inserted in the final section of the guide channel owing to the action of the spring and securing the blocking bar, thereby preventing the involuntary closure of said overpressure door.

14. Opening and secure-closing system for doors according to claim 1, wherein the first door comprises means of securing of the first door and the second door comprises means of securing of the second door which are secured to the fixed structure once said first door and second door are open, thereby preventing their involuntary closure.

15. Opening and secure-closing system for doors according to claim 14, wherein the means of securing of the first door is a telescopic bar of the first door and the means of securing of the second door is a telescopic bar.

16. Opening and secure-closing system for doors according to claim 1, wherein the chamber to which access is had via the first door and the second door is an Auxiliary Power Unit in an aircraft.

* * * * *